UNITED STATES PATENT OFFICE.

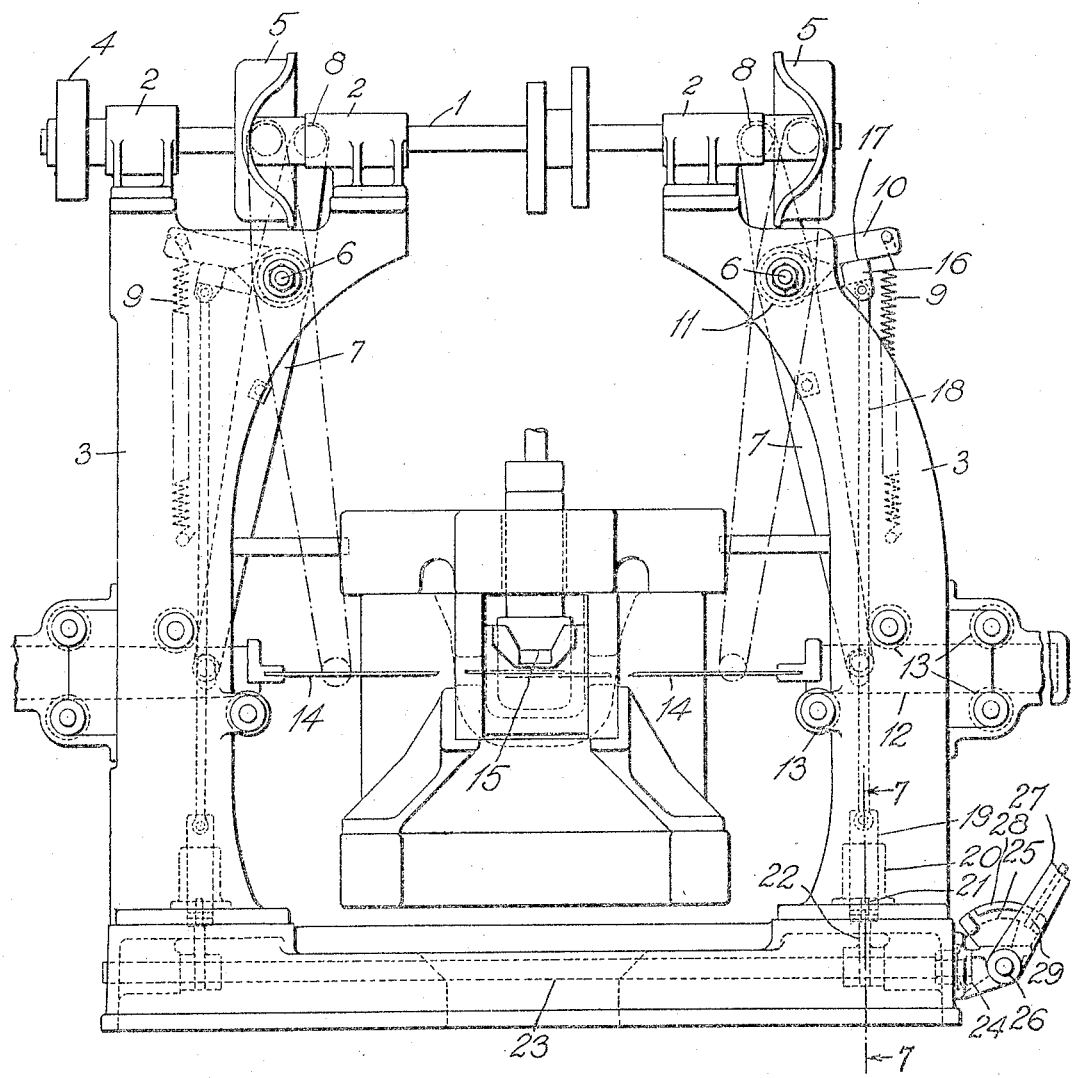

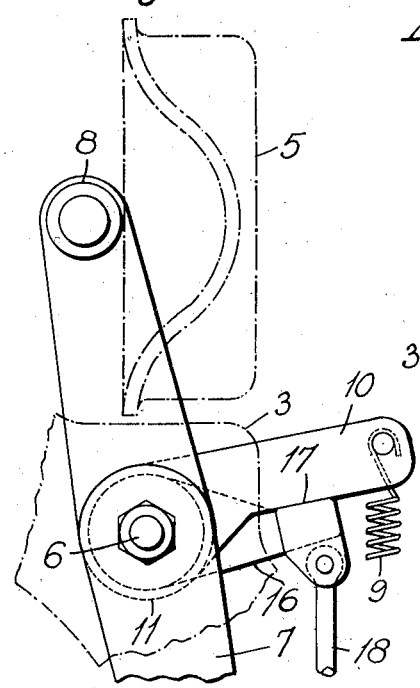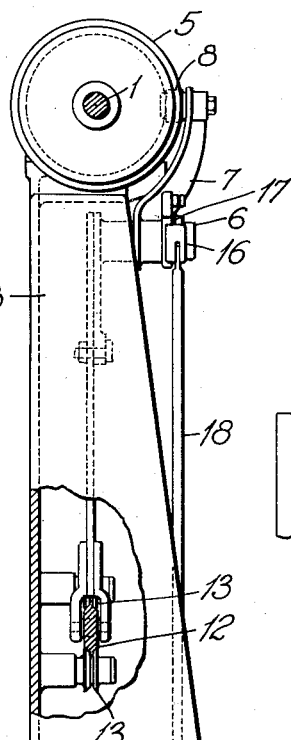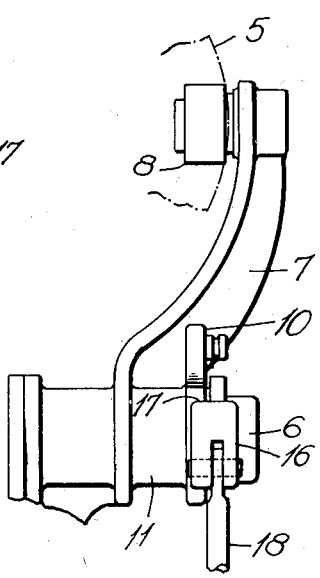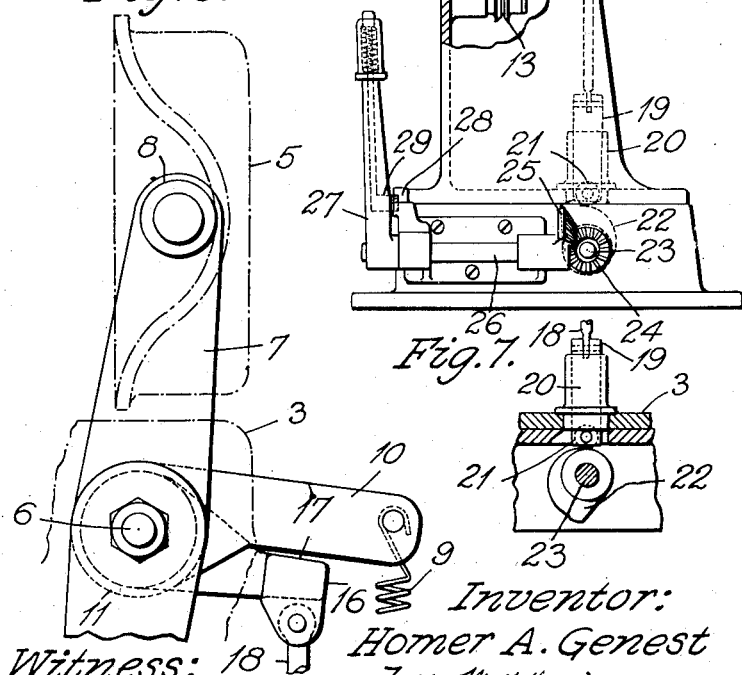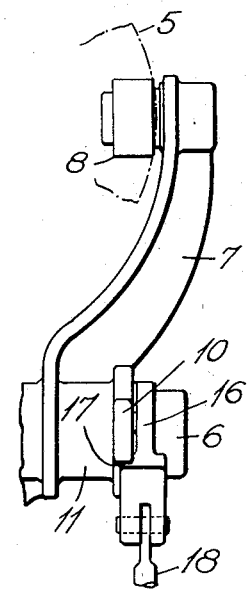

HOMER A. GENEST, OF HARTFORD, CONNECTICUT, ASSIGNOR TO HARTFORD-FAIRMONT COMPANY, OF CANAJOHARIE, NEW YORK, A CORPORATION OF NEW YORK.

SHEAR MECHANISM FOR GLASS-WORKING MACHINES.

1,331,847.   Specification of Letters Patent.   Patented Feb. 24, 1920.

Application filed March 28, 1917. Serial No. 157,946.

*To all whom it may concern:*

Be it known that I, HOMER A. GENEST, a citizen of the United States, residing at Hartford, in the county of Hartford and State of Connecticut, have invented new and useful Improvements in Shear Mechanisms for Glass-Working Machines, of which the following is a specification.

Machines which are designed to feed gathers or charges of molten glass from the outlet of a melting furnace or other container of molten glass are provided with shears arranged to intermittently cut off drops of predetermined definite quantities of molten glass as the glass emerges from the discharge outlet. This invention relates to the mechanism provided for operating such shears.

When the glass shaping machine, to which the charges or gathers cut from the supply by the shears are fed, is stopped for making adjustments, or for changing the molds or for other reasons, it is desirable to continue the glass feeding operation so that it will not "freeze" at or around the outlet. This necessitates keeping the glass feeding means in continuous operation, but makes it desirable to throw out the mechanism for operating the shear blades so as to render them temporarily inoperative for severing charges or gathers of glass, and the present invention contemplates means for accomplishing this.

The object of the invention is to provide a very simple and easily and quickly manipulated means by which the shear mechanism may be controlled separately from the feeding mechanism, whereby the shears can be put out of operation without stopping the feeding mechanism, and can again be put in operation in proper synchronism with the feeding means.

Of the accompanying drawings Figure 1 shows a front elevation of so much of a glass feeding machine and the shear operating mechanisms as is necessary to an understanding of the present invention. Fig. 2 shows a side elevation of the parts shown in Fig. 1, with a portion of the machine frame broken away. Fig. 3 shows on larger scale a front view of the upper end of a shear operating lever and the cam for actuating it, and also the upper end of the mechanism by means of which the lever may be thrown out of operative engagement with the cam. Fig. 4 shows a side view of the parts illustrated in Fig. 3. Fig. 5 is a view similar to that shown in Fig. 3, with the shear lever held out of operative relation to the cam. Fig. 6 shows a side view of the parts shown in Fig. 5. Fig. 7 is a section on the line 7—7 on Fig. 1.

In the type of machine illustrated the cam shaft 1 is held in bearings 2 mounted on the upper ends of the side frames 3. This cam shaft has a pulley 4 by means of which it may be driven from any convenient source of power, and is provided with shear operating cams 5. On each side of the frame, turning on studs 6 are shear levers 7. The upper end of each lever carries a roll 8 which when the shears are in operation are held in contact with the cams 5 by means of springs 9 which are connected between the frame and arms 10 which extend from the hubs 11 of the levers 7. The lower end of each of these levers is connected with a horizontally movable slide 12. In the machine shown, these slides are supported by grooved rollers 13. The inner end of each slide carries a shear blade 14. When the machine is in operation and it is desired that the shear blades perform their function of severing charges or gathers from the main supply of glass that is fed from the outlet 15 of the furnace or other container of molten glass, the cams 5 through the levers 7 reciprocate the blades toward and from each other at the proper intervals.

The levers for reciprocating the shear blades are thrown out of operative relation to the shear cams by the following means:—A stop arm 16 is mounted to turn on the stud 6 of each lever 7, and the ends 17 of this arm project under the arms 10 which project from the hubs of the levers 7. The end 17 of each arm 16 is connected by a rod 18 with a slide 19 which is vertically movable in a box 20, mounted on the bed of the frame, and has at its lower end a roller 21 in the path of the cam 22. These cams are mounted on a shaft 23 that at one side of the machine has a bevel gear 24 which meshes with a bevel gear 25 on a shaft 26. This shaft has at the front of the machine a hand lever 27, which is provided with a common form of latch 29 operated by a thumb piece 30, against the pressure of a spring 31, and engaging with notches in the quadrant 28.

By means of the handle 27 and cams 22, the arms 16 may be raised or lowered. When the arms 16 are raised their ends 17 engage the arms 10 and throw the upper ends of the levers 7 inward so that their rolls 8 will be moved clear of the cams 5. This causes the shear blades to be drawn apart and held stationary in their open position, although the cam shaft and the shear cams 5 continue to rotate. When the arms 16 are lowered they are brought down to such positions that their ends 17 are out of engagement with the arms 10. This permits the upper ends of the shear levers to be thrown outward and the rolls which they carry to engage with the cams, which then resume their normal functions of operating the shears.

The invention claimed is:—

1. The combination, with the shear operating mechanism of a glass feeding machine, having a yielding shear moving member, of means for retracting the shear and holding it out of normal operation, including a stop arm mounted for movement against the said moving member, a cam for actuating the stop arm, and means for moving the cam.

2. The combination, with the shear operating mechanism of a glass feeding machine, having a yielding shear moving member, a cam for actuating said moving member, of means for retracting the shear and holding it out of normal operation, including a stop arm engaging the moving member and mounted for swinging movement substantially co-extensive with that of the said moving member, and means for moving the stop arm to carry the said moving member out of engagement with said cam, and for retaining it in that position.

3. The combination, with the shear operating mechanism of a glass feeding machine, having a yielding shear moving member, a cam for actuating said moving member, of means for retracting the shear and holding it out of normal operation, including a stop arm engaging the moving member and mounted for swinging movement substantially coincident therewith, and a cam and connections for moving the stop arm to carry the shear moving member out of engagement with said cam and hold the shear in its retracted position, whereby the shear mechanism may be put out of operation independently of any associated mechanism.

4. The combination, with the shear operating mechanism of a glass feeding machine, having a yielding shear moving lever, and having a cam for operating the lever, of means for holding the lever out of engagement with its cam and retracting the shear beyond its normal working position, including a stop arm, a cam and connections to the stop arm, means for operating the last named cam, and a latching device for retaining the shear in its retracted position.

5. Shear mechanism for glass feeding machines, including a pair of coacting shear members, yielding operating means for moving the shear members through their shearing movement, stop members movable into and out of engagement with the shear members, a cam shaft and cams for thus moving the stop members, and means for moving the said shaft whereby the said stop members hold the shear members from being normally operated by their said yielding means.

6. Shear mechanism for glass feeding machines, including a pair of coacting shear members, yielding operating means moving the shear members through their shearing movement, cams for returning the shear members, stop members movable into and out of engagement with the shear members, a cam device for thus moving the stop members, and means for moving the said cam device whereby the stop members hold the shear members out of normal cutting operation, overcoming the said yielding operating means.

7. A glass shearing mechanism including a pair of coacting shear blades, levers for actuating said shear blades, yielding means for operating said levers to move said shear blades through their shearing movement, means for returning the said levers, stop members mounted adjacent said levers and in engaging relation thereto, a cam shaft and cams for operating said stop members, and means for moving said shaft and its cams whereby the said levers may be moved against the pressure of their said yielding means out of operative relation to said lever returning means.

8. A glass shearing mechanism including a pair of coacting shear blades, levers for actuating said shear blades, yielding means for operating said levers to move said shear blades through their shearing movement, means for returning the levers, stop members mounted adjacent said levers and in engaging relation thereto, a cam shaft and cams for operating the stop members, means for moving the shaft and its cams whereby the said levers may be moved against the pressure of said yielding means out of operative relation to said lever returning means, and a lever connected to said cam shaft and provided with a latch for retaining the lever in desired positions.

Signed at Hartford, Connecticut this 27th day of March, 1917.

HOMER A. GENEST.